United States Patent [19]

Tsuruki

[11] Patent Number: 4,725,153
[45] Date of Patent: Feb. 16, 1988

[54] THRUST ROLLER BEARING ASSEMBLY

[75] Inventor: Kenji Tsuruki, Fukuroi, Japan

[73] Assignee: NTN Toyo Bearing Co., Ltd., Osaka, Japan

[21] Appl. No.: 937,280

[22] Filed: Dec. 3, 1986

[30] Foreign Application Priority Data

Dec. 4, 1985 [JP] Japan ................................ 60-273993

[51] Int. Cl.$^4$ ............................................. F16C 19/30
[52] U.S. Cl. ..................................... 384/620; 384/626
[58] Field of Search ............... 384/620, 626, 903, 619, 384/604, 448

[56] References Cited

U.S. PATENT DOCUMENTS

| | | | |
|---|---|---|---|
| 4,310,205 | 1/1982 | Condon et al. | 384/620 |
| 4,339,159 | 7/1982 | Miller | 384/903 |
| 4,592,389 | 6/1986 | Yamada et al. | 384/903 |
| 4,648,728 | 3/1987 | Erdelitsch et al. | 384/903 |

Primary Examiner—Lenard A. Footland
Attorney, Agent, or Firm—Armstrong, Nikaido, Marmelstein & Kubovcik

[57] ABSTRACT

An improved thrust roller bearing assembly is proposed which comprises a thrust roller bearing and an annular shim. According to this invention, the shim can be coupled with the thrust roller bearing beforehand. This simplifies the assembly of related members. Engaging means provided on the cylindrical portion of the outer race or the inner race or on the shim assures a stable coupling of the shim with the thrust roller bearing.

1 Claim, 17 Drawing Figures

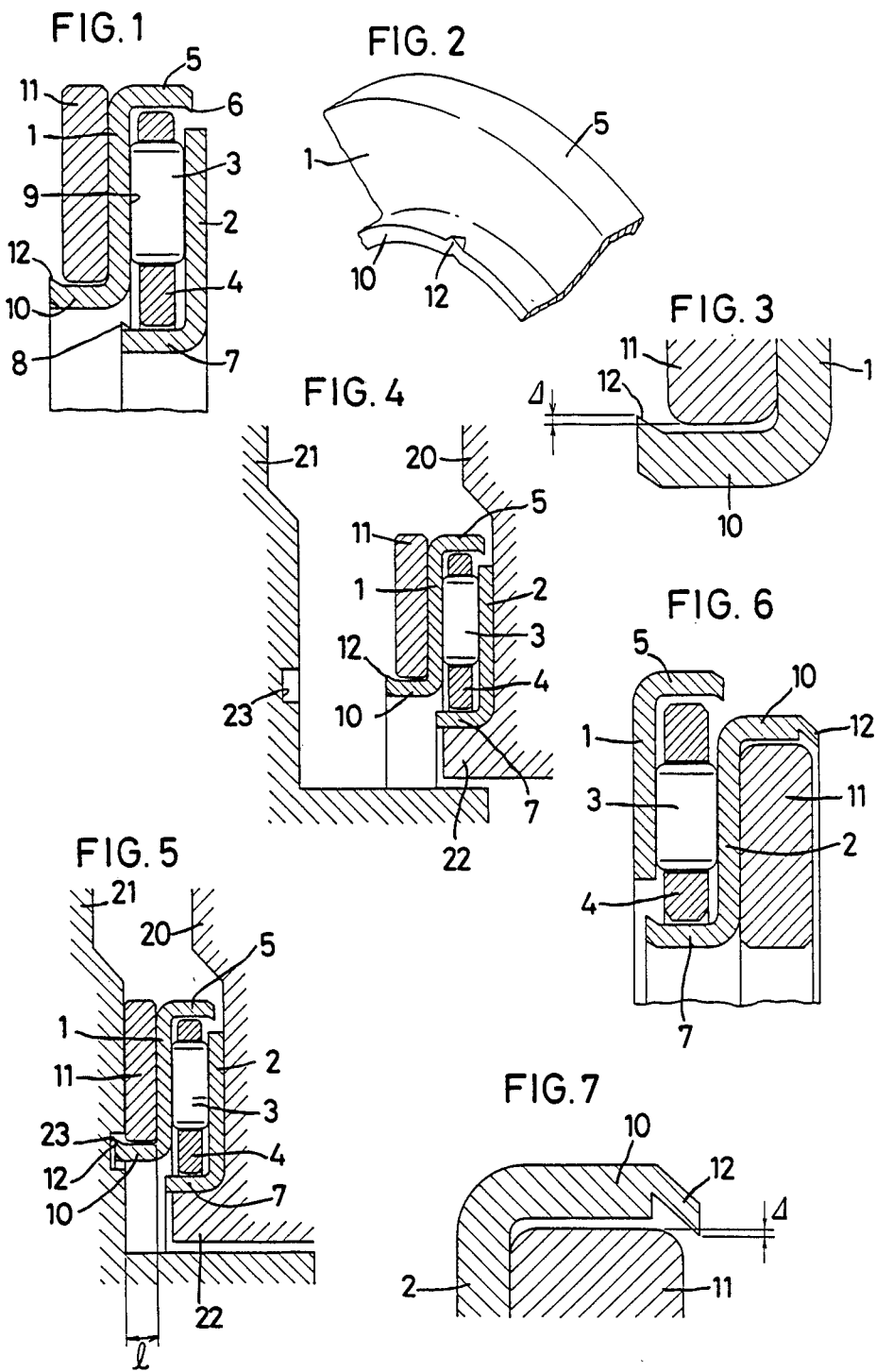

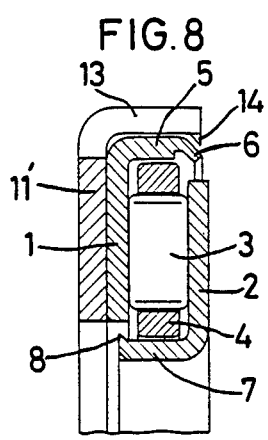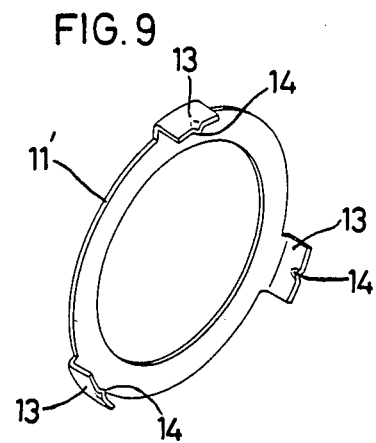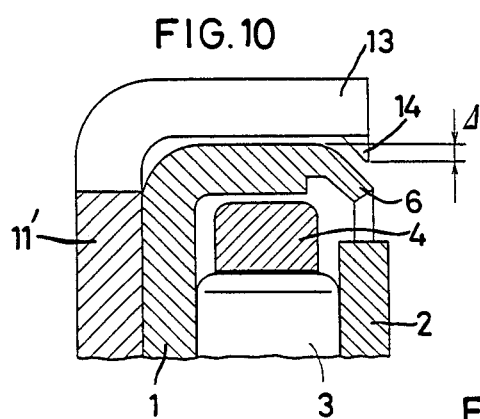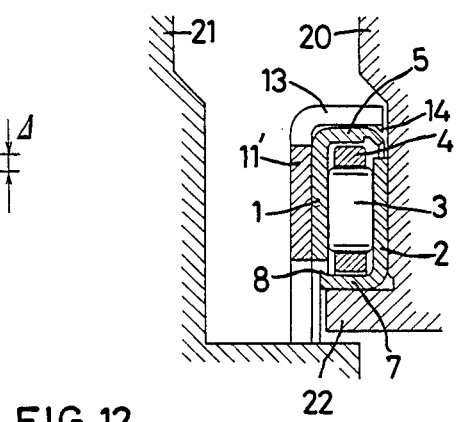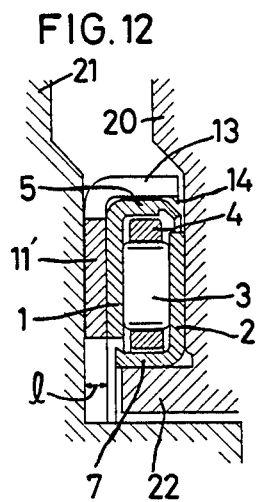

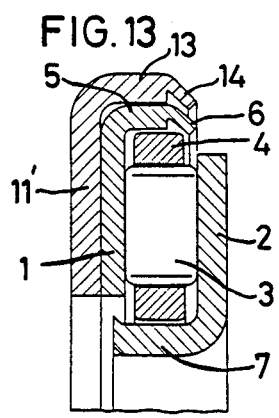
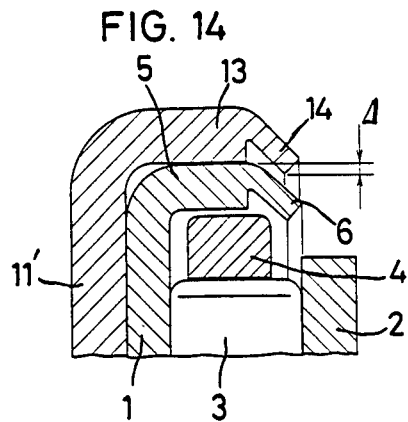
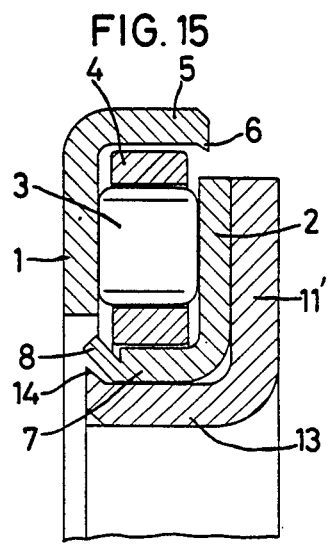
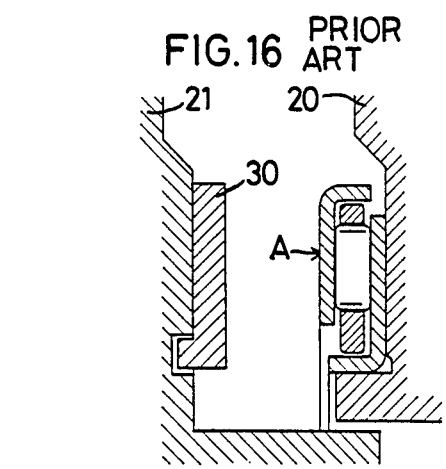
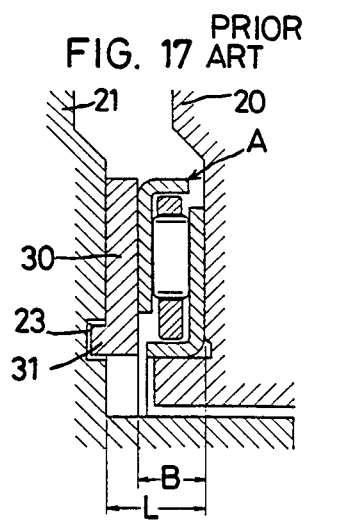

THRUST ROLLER BEARING ASSEMBLY

BACKGROUND OF THE INVENTION

The present invention relates to a thrust roller bearing assembly mainly used in an automatic transmission of an automobile.

Helical gears are usually employed in the automatic transmission in order to ensure a smooth transmission of rotations. But, because an axial thrust is exerted with the rotation of the helical gears, it is necessary to support the axial thrust by use of thrust bearings such as thrust roller bearings.

Meanwhile, because each finished component of the transmission has some variation in dimensions, there is necessarily some variation in the axial gap with the thrust bearing assembled. In particular, if a plurality of helical gears are mounted outside of a shaft, a substantially large variation will be produced in the helical gear assembly assembled at the last stage as a result of accumulation of the variations in the assemblies assembled at early stages. Therefore it is customary to compensate for the variation in the axial gap by using a shim of a suitable thickness.

It has hitherto been usual to measure a gap dimension L between a thrust member 20 such as helical gears and a pressure receiving member 21 as shown in FIG. 17, subtract the width B of the thrust roller bearing to be used from the dimension L, select a gap adjusting shim 30 having the nearest thickness to the calculated value out of several kinds of adjusting shims having different thicknesses prepared beforehand, and combine the thrust roller bearing A with the thrust members 20 and combining the gap adjusting shim 30 with the pressure receiving member 21, as shown in FIG. 16, and assemble the thrust member 20 and the pressure receiving member 21 together.

Since the gap adjusting shim 30 and the thrust roller bearing A are mounted separately, the assembly is very time-consuming. Moreover, because the gap adjusting shim is adapted to be supported by an engagement portion 31 formed on its inner edge so as to be received in an engagement groove 23 formed in the surface of the pressure receiving member 21, the gap adjusting shim 30 has a tendency to fall off or to cause displacement during the relative assembly of the thrust member 20 and pressure receiving member 21. This makes it more difficult to assemble the transmission system.

SUMMARY OF THE INVENTION

It is an object of this invention to solve the above problems and to simplify the assembly of the thrust member relative to the pressure receiving member.

From one aspect of the present invention, there is provided a thrust roller bearing assembly comprising a thrust roller bearing and an annular shim, the bearing including an outer race having an inwardly extending flange at outer edge thereof, an inner race having an inwardly extending flange at inner edge thereof, a retainer disposed between said outer race and said inner race, and rollers retained by the retainer, the outer race or the inner race being formed with a cylindrical portion at inner or outer edge thereof projecting away from the bearing to support the shim, the cylindrical portion being formed with means engaging the shim to prevent it from coming off the outer race.

From another aspect of the present invention, there is provided a thrust roller bearing assembly comprising a thrust roller bearing and a shim, the bearing including an outer race having an inwardly extending flange at outer edge thereof, an inner race having an inwardly extending flange at inner edge thereof, a retainer disposed between the outer race and the inner race, and rollers retained by the retainer, the shim being formed with an engaging portion projecting toward the bearing so as to cover the outer periphery of the flange of the outer race or the inner race, the engaging portion being formed with a projection adapted to engage the edge of the flange to prevent the bearing from coming off the shim.

Owing to such a structure, the shim can be coupled with the bearing beforehand to form a thrust roller bearing assembly. This simplifies the assembly of a thrust member relative to a pressure receiving member. Further, since engaging means is provided on the cylindrical portion of the outer race or the inner race or on the shim, the shim can be stably coupled with the thrust roller bearing. This eliminates the possibility of the shim coming off or displacing and increases the efficiency of assembly of the thrust member relative to the pressure receiving member.

Other objects and features of the present invention will become apparent from the following description taken with reference to the accompanying drawings, in which:

BRIEF DESCRIPTION OF THE DRAWINGS

FIG. 1 is a sectional view of a portion of a thrust roller bearing assembly of the first embodiment;

FIG. 2 is a perspective view of a portion of the outer race used in the first embodiment;

FIG. 3 is a partial enlarged sectional view of the assembly of FIG. 1;

FIGS. 4 and 5 are sectional views showing how the assembly of FIG. 1 is assembled;

FIG. 6 is a sectional view of a portion of the second embodiment;

FIG. 7 is a partial enlarged sectional view of the assembly of FIG. 6;

FIG. 8 is a sectional view of the third embodiment;

FIG. 9 is a perspective view of the gap adjusting shim used in the third embodiment;

FIG. 10 is a partial enlarged sectional view of the assembly of FIG. 8;

FIGS. 11 and 12 are sectional views showing how the third embodiment is assembled;

FIG. 13 is a sectional view of a variation of the third embodiment;

FIG. 14 is a partial enlarged sectional view thereof;

FIG. 15 is a sectional view of the fourth embodiment; and

FIGS. 16 and 17 are sectional views showing how a conventional thrust roller bearing assembly is assembled.

DETAILED DESCRIPTION OF THE PREFERRED EMBODIMENT

As shown in FIG. 1, a thrust roller bearing comprises an outer race 1, an inner race 2, rollers 3 incorporated between the races 1 and 2, and a cage 4 for retaining the rollers 3. A flange 5 is formed along an outer edge of the outer race 1 so as to extend inwardly and cover the outer periphery of the cage 4. A plurality of engagement portions 6 extend inwardly from the edge of the opening of the flange 5 to prevent the cage 4 from coming off.

A flange 7 is formed along the edge of the inner circumference of the inner race 2 so as to extend inwardly and be inserted into an opening of the cage 4. A plurality of engagement projections 8 extend outwardly from the edge of the opening of the flange 7 to prevent the cage 4 from slipping off.

A cylindrical portion 10 is formed along the edge of the internal circumference of the outer race 1 so as to protrude away from a roller guide surface 9. An annular shim 11 for adjusting the gap is adapted to be mounted on the cylindrical portion 10 of the outer race 1.

As shown in FIGS. 2 and 3, the edge of the opening of the cylindrical portion 10 is formed with a plurality of projections 12 extending outwardly. An interference margin (Δ) is formed between the projections 12 and the inner edge of the shim 11 to prevent the shim 11 from falling off. Owing to elastic deformation of the projections 12, the shim 11 can be mounted and removed freely.

In assembling the thrust roller bearing assembly, an axial gap variation l (FIG. 5) formed between the thrust member 20 and the pressure receiving member 21 is firstly measured. A shim 11 having a sufficient thickness to compensate for the variation is selected out of several kinds of shims prepared in advance. It is then mounted on the cylindrical portion 10 of the outer race 1 to axially couple the thrust roller bearing with the shim 11. With the bearing assembly put between the thrust member 20 and the pressure receiving member 21, these members are assembled relative to each other.

In this case, on the surface of the thrust member 20 facing the pressure receiving member 21, a bearing supporting portion 22 is formed. A groove 23 is formed in the pressure receiving member 21 to receive the tip of the cylindrical portion 10 of the outer race 1.

When the shim 11 is forcibly mounted onto the cylindrical portion 10, the interference margin Δ formed between the projections 12 and the inner edge of the shim 11 will prevent the shim 11 from falling off. Now, the thrust roller bearing is successfully coupled with the shim 11. As shown in FIG. 4, the assembly is mounted on the bearing supporting shaft 22. When the thrust member 20 and the pressure receiving member 21 are moved toward each other, the surface of the shim 11 will butt the pressure receiving member 21 while the tip of the cylindrical portion 10 of the outer race 1 fits into the groove 23. This completes the assembly of the thrust member 20 with the pressure receiving member 21.

Although in the first embodiment shown in FIG. 1 the cylindrical portion 10 is formed along the inner edge of the outer race 1, it may be formed along the outer periphery of the inner race 2 instead. The projections 12 protruding inwardly may be formed on the edge of the opening of the cylindrical portion 10 of the inner race 2. In case of the second embodiment of FIG. 6, the thrust member 20 should be formed with the bearing support shaft 22 and the receiving groove 23.

The projections 12 provided at the edge of the opening of the cylindrical portion 10 may be formed either in the form of projections as illustrated in FIG. 2 or in the form of an annular flange as shown in FIG. 7. In the former case, a plurality of projections should be provided on the cylindrical portion 10.

Referring to FIG. 8 showing the third embodiment, the thrust roller bearing includes an outer race 1, an inner race 2, rollers 3 incorporated between the two races 1 and 2, and a cage 4 for retaining the rollers 3. A flange 5 is formed along the outer periphery of the outer race 1 so as to cover the outer periphery of the cage 4. A plurality of engagement projections 6 extend inwardly from the edge of the opening of the flange 5 so as to engage the outer periphery of the cage 4, thereby preventing an axial separation of the outer race 1 away from the cage 4.

A flange 7 is formed along the inner circumference of the inner race 2 so as to be received in the opening of the cage 4. A plurality of engaging projections 8 are formed on the flange 7 so as to engage the inner periphery of the cage 4, thus preventing the inner race 2 and the cage 4 from separating from each other in an axial direction.

Along the outer circumference of an annular shim 11' for a gap adjustment mounted on the outer race 1, a plurality of engagement portions 13 are formed so as to cover parts of the outer periphery of the flange 5 of the outer race 1. At the tip of each engagement portion 13, a projection 14 extending inwardly is formed as shown in FIG. 10. An interference margin Δ formed between the projection 14 and the outer periphery of the flange 5 will keep the gap adjustment shim 11' coupled with the outer race 1. Also, the outer race 1 and the gap adjustment shim 11' will be separated when they are drawn in opposite directions away from each other.

In assembling the thrust roller bearing assembly of FIG. 8, the axial gap variation l (FIG. 12) formed between the thrust member 20 and the pressure receiving member 21 is calculated and then a gap adjustment shim 11' thick enough to compensate for the variation is selected out of several kinds of shims prepared beforehand. The shim 11' is coupled with the thrust roller bearing.

When the shim 11' is mounted on the surface of the outer race 1, the projections 14 on the engagement portions 13 engage the edge of the opening of the flange 5 to provide an axial connection of the thrust roller bearing and the gap adjustment shim 11'.

The thrust roller bearing assembly thus assembled is set between the thrust member 20 and the pressure receiving member 21, as shown in FIGS. 11 and 12.

Although in the third embodiment shown in FIG. 8, the engagement portions 13 on the shim 11' are in the form of a plurality of inwardly protruding pieces, they may be in the form of a flange adapted to be mounted on the flange 5 of the outer race 1.

Also, the projection 14 formed at the tip of each engagement portion 13 may be in the form of either a projection as shown in FIG. 9 or bent-down portions as shown in FIG. 14.

Another embodiment of the thrust roller baring assembly is shown in FIG. 15. It is different from the third embodiment of FIG. 8 in that the gap adjustment shim 11' is mounted on the inner surface of the inner race 2, the engagement portions 13 being formed along the inner circumference of the shim so as to be inserted into the flange 7 of the inner race 2 and the projections formed at the tip of the engagement portion 13 so as to engage the edge of the flange 7.

The gap adjustment shim 11' may be installed on at least one of the outer race 1 and the inner race 2, or on both of them.

What is claimed is:

1. A thrust roller bearing assembly comprising a thrust roller bearing of a non-separable type and an annular shim, said bearing including an outer race having an inwardly extending flange at outer edge thereof, an inner race having an inwardly extending flange at inner edge thereof, a retainer disposed between said outer race and said inner race, and rollers retained by said retainer, said shim being formed with an engaging portion projecting toward said bearing so as to cover the outer periphery of said flange of said outer race, said engaging portion being formed with a projection adapted to engage the edge of said flange to prevent said bearing from coming off said shim.

* * * * *